Patented Dec. 5, 1950

2,533,016

UNITED STATES PATENT OFFICE 2,533,016

REGENERATION OF SYNTHETIC RUBBER

Theodore A. Johnson and Harry H. Thompson, Akron, Ohio, assignors to Wingfoot Corporation, Akron, Ohio, a corporation of Delaware No Drawing. Application December 12, 1946, Serial No. 715,638

1 Claim. (Cl. 260—2.3)

This invention relates to the reclaiming or regeneration of synthetic rubber and, more particularly, to the reclaiming or regeneration of diene synthetic rubbers.

There are, of course, a large number of processes and variations thereof for reclaiming natural rubber. With the widespread use of synthetic rubbers, necessitated by the cutting off of our crude rubber supplies during the recent war, it became necessary to find suitable processes for reclaiming or regenerating these synthetic rubbers. This constituted a serious problem and it was unfortunately found that these rubbers could not be reclaimed by merely processing them in the same manner which had been commercially used for natural rubber. For example, when a diene rubber prepared by copolymerizing a diene, such as butadiene-1,3, with another polymerizable material, such as styrene or acrylonitrile, is subjected to the usual alkali process for reclaiming natural rubber, the product, while devulcanized, is not a smooth, uniform, usable material. A principal object of the present process is to further treat such devulcanized diene rubbers so as to put them in satisfactory condition for use. It is used to particular advantage in conjunction with the alkali process of reclaiming.

According to the practice of the invention, scrap articles made from a diene rubber are ground, cooked, washed, and dried according to one of the usual processes for the reclaiming of natural rubber, such as the well-known alkali or acid processes. This devulcanized material is then masticated, for example on a mill or in an internal mixer and, during the mechanical working, a liquid polyhydric alcohol is added and worked into the rubber, and the mixture is masticated until a smooth mass of the desired degree of plasticity is obtained.

As an illustration of the practice of the invention, scrap tires made from GR-S (a copolymer of butadiene-1,3 and styrene) are devulcanized by the standard alkali process. The deculcanized, dried material is then placed on an apron mill and about one and a half percent by weight of ethylene glycol is added to the bank on the mill and the mass is worked for about fifteen minutes. It is then strained and refined in the usual manner, a single pass on the refiner usually being sufficient. The product so obtained is a very smooth, uniform, coherent sheet, free from lumps and of very satisfactory quality.

While glycerine is not quite as effective as ethylene glycol, it may be used. Furthermore, various liquid homologues of ethylene glycol and glycerine may also be used. Thus, propylene glycol and ethylhexane diol give results comparable to those obtained with ethylene glycol. Other representative examples of such glycols and glycerols are the butylene glycols, the amylene glycols, 1-methyl glycerol, 1,3-dimethyl glycerol and beta-ethyl glycerol. The glycols or alkylene diols are preferred.

The time of working may vary considerably, depending upon the selection of polyhydric alcohol, the particular stock being treated, the extent of the prior devulcanization treatment and other factors, but the time required to obtain a coherent sheet of the desired smoothness and plasticity can be readily determined for any particular case.

The quantity of ethylene glycol or other polyhydric alcohol may also be varied considerably. Small quantities from about one percent to five percent are ordinarily sufficient.

While the process may be used to advantage with various diene rubbers, such copolymers of butadiene-1,3 with styrene or acrylonitrile, it is particularly useful with styrene-butadiene-1,3 rubber, such as that known as GR-S.

The process is also applicable to blends or mixtures of such diene rubbers with other materials, including natural rubber.

We claim:

A process for reclaiming a vulcanized rubberlike copolymer of butadiene-1,3 and styrene which comprises subjecting the copolymer to the alkali process for reclaiming natural rubber and thereafter masticating the copolymer with from about one to five percent of ethylene glycol.

THEODORE A. JOHNSON.
HARRY H. THOMPSON.

REFERENCES CITED

The following references are of record in the file of this patent:

UNITED STATES PATENTS

| Number | Name | Date |
| --- | --- | --- |
| 2,386,707 | Moore et al. | Oct. 9, 1945 |

OTHER REFERENCES

Ludwig et al., India Rubber World, vol. III, No. 2 (Nov. 1944), pages 180–186.

Gillman, Rubber Age, March 1946, pp. 709–14.

Certificate of Correction

Patent No. 2,533,016                                                     December 5, 1950

THEODORE A. JOHNSON ET AL.

It is hereby certified that error appears in the printed specification of the above numbered patent requiring correction as follows:

Column 1, lines 44 and 45, for "deculcanized" read *devulcanized*; column 2, line 25, after the word "such" insert *as*;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*